United States Patent

Schaffer et al.

[11] Patent Number: 4,801,693
[45] Date of Patent: Jan. 31, 1989

[54] SUBSTITUTED SULFOBENZENE AND TRIAZINE-CONTAINING REACTIVE DYES

[75] Inventors: Ortwin Schaffer, Ludwigshafen; Manfred Patsch, Wachenheim, both of Fed. Rep. of Germany

[73] Assignee: BASF Aktiengesellschaft, Ludwigshafen, Fed. Rep. of Germany

[21] Appl. No.: 88,533

[22] Filed: Aug. 20, 1987

Related U.S. Application Data

[63] Continuation of Ser. No. 739,705, May 31, 1985, abandoned.

[51] Int. Cl.$^4$ .................. C09B 62/03; C09B 62/513; D06P 3/10; D06P 3/66
[52] U.S. Cl. .................. 534/637; 534/617; 534/634; 534/642
[58] Field of Search .................. 534/617, 637, 642

[56] References Cited

U.S. PATENT DOCUMENTS

| | | | |
|---|---|---|---|
| 2,257,205 | 10/1953 | Heyna et al. | 534/642 |
| 3,190,872 | 6/1965 | Oesterlein et al. | 534/637 |
| 3,663,526 | 5/1972 | Oesterlein et al. | 534/637 |
| 3,711,460 | 1/1973 | Schundehutte | 534/637 |
| 4,314,818 | 2/1982 | Courtin | 534/637 X |
| 4,412,948 | 11/1983 | Omura et al. | 534/637 |
| 4,460,505 | 7/1984 | Schunderhutte et al. | 534/637 |
| 4,492,654 | 1/1985 | Hoyer et al. | 534/637 |

FOREIGN PATENT DOCUMENTS

| | | | |
|---|---|---|---|
| 0022265 | 1/1981 | European Pat. Off. | 534/637 |
| 0043560 | 1/1982 | European Pat. Off. | 534/642 |
| 0094020 | 11/1983 | European Pat. Off. | 534/642 |
| 3113885 | 10/1982 | Fed. Rep. of Germany | 534/642 |
| 1546368 | 10/1968 | France | 534/637 |
| 43-15299 | 6/1968 | Japan | 534/642 |
| 58-8764 | 1/1983 | Japan | 534/642 |
| 1106244 | 3/1968 | United Kingdom | 534/642 |

OTHER PUBLICATIONS

Chemical Abstracts, vol. 99, #72166a (1983).
Chemical Abstracts, Band 99, Nr. 10, 5. Sep. 1983, Seite 69, Nr. 72166a, Columbus, Ohio, US; & JP-A-58 08 764 (Sumitomo Chemical Co., Ltd.) 18-01-1983.

*Primary Examiner*—Floyd D. Higel
*Attorney, Agent, or Firm*—Oblon, Fisher, Spivak, McClelland & Maier

[57] ABSTRACT

Novel compounds of the general formula I

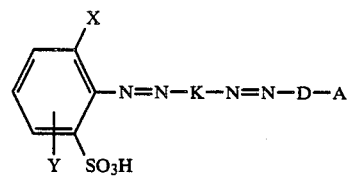

where A is a fiber-reactive radical of the triazine, pyrimidine or vinylsulfone series, D is a radical of a sulfo-containing diazo component of the aniline or aminonaphthalene series, K is the radical of a coupling component of the aminohydroxynaphthalene series, X is fluorine, chlorine, bromine, $C_1$-$C_4$-alkyl, trifluoromethyl, $C_1$-$C_4$-alkoxy, phenoxy, hydroxysulfonyl, carboxyl, acetyl, propionyl, methylsulfonyl, ethylsulfonyl, phenylsulfonyl, $C_1$-$C_4$-alkoxycarbonyl, phenoxysulfonyl or unsubstituted or substituted carbamyl or sulfamyl, and Y is fluorine, chlorine, bromine, $C_1$-$C_4$-alkyl, trifluoromethyl, $C_1$-$C_4$-alkoxy, phenoxy, phenoxysulfonyl, acetyl, propionyl, methylsulfonyl, ethylsulfonyl, phenylsulfonyl, p-acetylaminophenylsulfonyl, hydroxysulfonyl, $C_1$-$C_4$-alkoxycarbonyl, hydroxycarbonyl or unsubstituted or substituted carbamyl or sulfamyl, are very useful for dyeing wool and hydroxyl-containing fibers, such as cellulose and in particular cotton.

15 Claims, No Drawings

SUBSTITUTED SULFOBENZENE AND TRIAZINE-CONTAINING REACTIVE DYES

This application is a continuation of application Ser. No. 739,705, filed on May 31, 1985, now abandoned.

SUMMARY OF THE INVENTION

The present invention relates to compounds of the general formula I

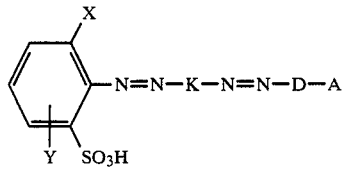

where A is a fiber-reactive radical of the triazine, pyrimidine or vinylsulfone series, D is a radical of a sulfo-containing diazo component of the aniline or aminonaphthalene series, K is the radical of a coupling component of the aminohydroxynaphthalene series, X is fluorine, chlorine, bromine, $C_1$–$C_4$-alkyl, trifluoromethyl, $C_1$–$C_4$-alkoxy, phenoxy, hydroxysulfonyl, carboxyl, acetyl, propionyl, methylsulfonyl, ethylsulfonyl, phenylsulfonyl, $C_1$–$C_4$-aklkoxycarbonyl, phenoxysulfonyl or unsubstituted or substituted carbamyl or sulfamyl, and Y is fluorine, chlorine, bromine, $C_1$–$C_4$-alkyl, trifluoromethyl, $C_1$–$C_4$-alkoxy, phenoxy, phenoxysulfonyl, acetyl, propionyl, methylsulfonyl, ethylsulfonyl, phenylsulfonyl, p-acetylaminophenylsulfonyl, hydroxysulfonyl, $C_1$–$C_4$-alkoxycarbonyl, hydroxycarbonyl or unsubstituted or substituted carbamyl or sulfamyl.

DETAILED DESCRIPTION OF THE PREFERRED EMBODIMENTS

Coupling components K of the aminohydroxynaphthalene series preferably contain sulfo groups. Examples are 1-amino-8-hydroxynaphthalene-4-sulfonic acid, 2-amino-5-hydroxynaphthalene-7-sulfonic acid, 1-amino-8-hydroxynaphthalene-4,6-disulfonic acid and, in particular, 1-amino-8-hydroxynaphthalene-3,6-disulfonic acid.

Examples of radicals X in addition to those stated above are methyl, ethyl, n-butyl, methoxy, ethoxy, methoxycarbonyl, ethoxycarbonyl, aminosulfonyl, dimethylaminosulfonyl, morpholinosulfonyl, aminocarbonyl, dimethylaminocarbonyl and morpholinocarbonyl.

The substituent Y is meta or para to the azo group. Specific examples of radicals Y in addition to those stated above are methyl, ethyl, methoxy, ethoxy, methoxycarbonyl, ethoxycarbonyl, acetyl, propionyl, aminosulfonyl, dimethylaminosulfonyl, morpholinosulfonyl, piperidinosulfonyl, cyclohexylaminosulfonyl, aminocarbonyl, dimethylaminocarbonyl and morpholinocarbonyl.

Examples of preferred radicals X are fluorine, chlorine, bromine, methyl, trifluoromethyl, hydroxysulfonyl, methylsulfonyl, ethylsulfonyl and hydroxycarbonyl.

Y is preferably para to the azo group, preferred radicals Y being fluorine, chlorine, bromine, methyl, ethyl, trifluoromethyl, hydroxysulfonyl, methylsulfonyl, phenylsulfonyl, hydroxycarbonyl, dimethylaminosulfonyl and morpholinosulfonyl.

Diazo component radicals D are derived from the aniline or aminonaphthalene series and contain sulfo groups. Specific examples are 1,3-phenylenediamine-4-sulfonic acid, 1,4-phenylenediamine-2-sulfonic acid, 1,3-diamino-5-sulfo-6-methoxybenzene, 1,4-diamino-3-methoxy-6-sulfobenzene, 1,3-diamino-4-sulfo-6-methylbenzene, 1,3-diamino-4-sulfo-6-methoxybenzene, 1,3-diamino-2-methyl-5-sulfobenzene, 1,3-diamino-5-sulfo-6-chlorobenzene, 1,3-diamino-4,6-disulfobenzene, 1,4-diamino-2,5-disulfobenzene, 1,3-diamino-4-sulfo-6-chlorobenzene, 1,6-diaminonaphthalene-4-sulfonic acid, 2,6-diaminonaphthalene-4,8-disulfonic acid, 2,6-diaminonaphthalene-8-sulfonic acid, 5-(ω-aminomethyl)-2-aminonaphthalene-1-sulfonic acid, 5-(ω-N-methyl-aminomethyl)-2-aminonaphthalene-1-sulfonic acid, 4-(ω-N-methyl-aminomethyl)-2-sulfoaniline, 4-(ω-aminomethyl)-2-sulfoaniline, 3-(ω-N-methyl-aminomethyl)-6-sulfoaniline and 3-(ω-aminomethyl)-4-methyl-6-sulfoaniline.

Examples of preferred diazo component radicals D are 1,3-phenylenediamine-4-sulfonic acid, 1,4-phenylenediamine-2-sulfonic acid, 1,3-phenylenediamine-4,6-disulfonic acid, 1,4-phenylenediamine-2,5-disulfonic acid, 2,6-diaminonaphthalene-4,8-disulfonic acid, p-(β-sulfatoethylsulfonyl)-aniline and m-(β-sulfatoethylsulfonyl)-aniline.

Examples of reactive radicals of the pyrimidine series are 2,6-dichloropyrimidine-4- and -5-carbonyl chloride, 2,6-dichloropyrimidine-5-sulfonyl chloride, 2,4,6-trichloropyrimidine, 2,4,6-trichloro-5-methylpyrimidine, 2,4,6-tribromo-5-cyanopyrimidine, 2,4,5,6-tetrachloropyrimidine, 2,4,6-trifluoropyrimidine, 2,4,6-trifluoro-5-chloropyrimidine, 4,6-difluoro-5-chloropyrimidine, 2-methylsulfonyl-4-chloro-6-methylpyrimidine, 2-methylsulfonyl-4,5-dichloro-6-methylpyrimidine, 2-methylsulfonyl-4-chloropyrimidine-5-carbonyl chloride, 2,4,6-trichloro-5-methylsulfonylpyrimidine, 2,4,6-trifluoro-5-methylsulfonylpyrimidine, 2-methyl-4,6-dichloro-5-methylsulfonylpyrimidine, 2,4,5-trichloro-6-methylsulfonylpyrimidine and 2,4,6-trichloropyrimidine-5-carbonyl chloride.

Reactive radicals A are preferably derived from the chlorotriazine series, and are bonded to the chromophore via an imino or iminomethylene bridge. They are of the formula

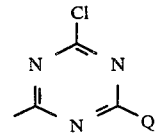

where Q is chlorine, methyl, phenyl, methoxy, ethoxy, propoxy, isopropoxy, butoxy, 4-tert.-butylphenoxy or a radical of the formula

and $R^1$ is hydrogen, $C_1$–$C_8$-alkyl which can be substituted by unsubstituted or substituted phenyl or by $C_1$–$C_4$-alkoxy, hydroxyl, cyano, amino, chlorine, bromine, hydroxysulfonyl, acetoxy, hydroxycarbonyl or phenoxy, or is cycloalkyl or unsubstituted or substituted aryl, and $R^2$ is hydrogen or $C_1$–$C_8$-alkyl which is unsubstituted or substituted by cyano, hydroxyl or $C_1$–$C_4$- alkoxy, or R¹ and R², together with an O or N atom, form a heterocyclic ring.

Specific examples of compounds from which the radicals

are derived are ammonia, methylamine, ethylamine, propylamine, isopropylamine, dimethylamine, ethanolamine, diethanolamine, β-chloroethylamine, β-methoxyethylamine, β-(4-sulfophenyl)-ethylamine, β-(4-sulfophenyl)-methylamine, aminoacetic acid, N-methylaminoacetic acid, taurine, N-methyltaurine, cyclohexylamine, piperidine, morpholine, aniline, N-methylaniline, N-ethylaniline, N-methyl-m-toluidine, o-, m- or p-toluidine, o-, m- or p-anisidine, o-, m- or p-fluoro, chloro- or bromoaniline, aniline-2,4-, -2,5- and -3,5-disulfonic acid, aniline-o-, -m- and -p-sulfonic acid, o-, m- and p-aminobenzoic acid, 4- and 5-sulfobenzoic acid, N-methylanthranilic acid, methyl o-, m- and p-aminobenzoate, 2-chloroaniline-4- and -5-sulfonic acid, 5-chloroaniline-2-sulfonic acid, 4-chloroaniline-2- and -3-sulfonic acid, 2-bromoaniline-4-sulfonic acid, 4-bromoaniline-2-sulfonic acid, 2-fluoroaniline-4-sulfonic acid, 2-methylaniline-4-sulfonic acid, 4-methylaniline-2- and -3-sulfonic acid, 3-methylaniline-4-sulfonic acid, 2-methoxyaniline-5-sulfonic acid, 4-methoxyaniline-2-sulfonic acid, 3-methoxyaniline-4-sulfonic acid and mono- and disulfonic acids of 1-amino- and 2-aminonaphthalene.

Preferred radicals

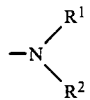

are derived from ammonia, methylamine, dimethylamine, cyclohexylamine, morpholine, aniline, N-methylaniline, aniline-m- or p-sulfonic acid, N-methylanthranilic acid or 1-aminonaphthalene-4- or -6-sulfonic acid.

Substituents A can, if desired, contain further reactive radicals on the triazine group, the said radicals being bonded to the triazine nucleus via nitrogen-containing bridge members. Specific examples are the following:

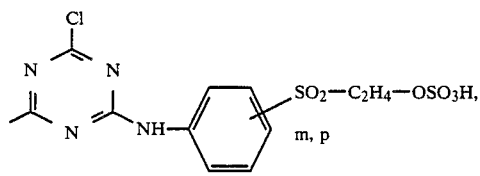

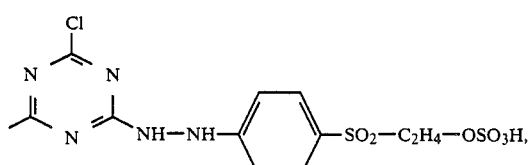

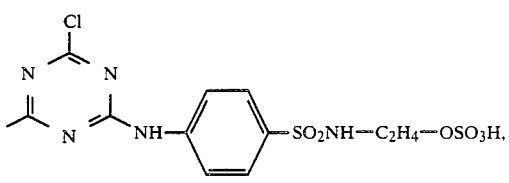

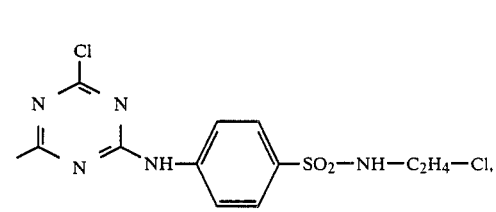

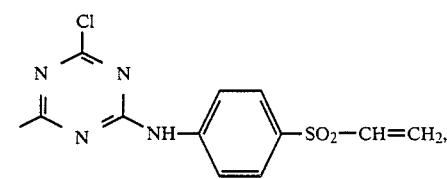

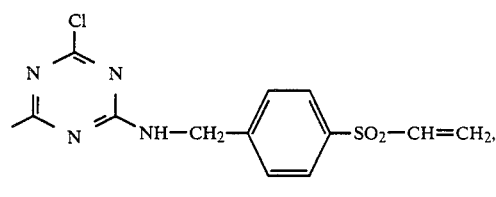

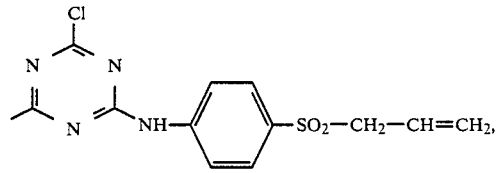

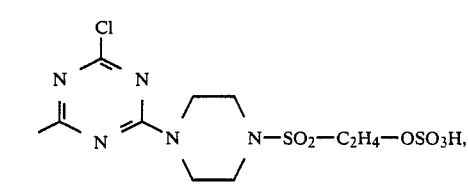

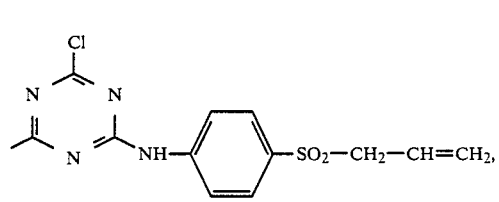

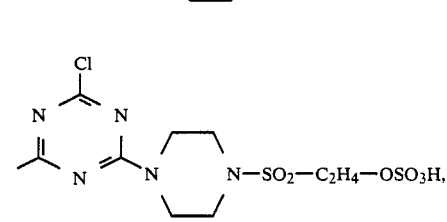

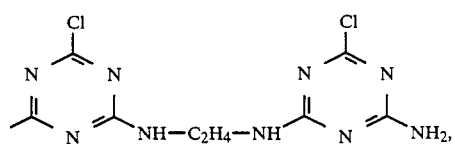

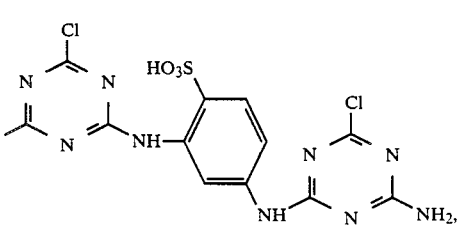

-continued

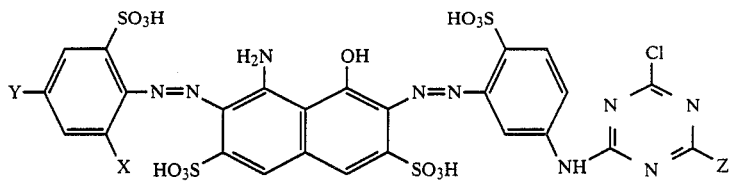

Of particular industrial importance are navy compounds of the formula

where Z is a radical of the vinylsulfonyl series or of the formula $$N\begin{matrix}R^1\\ R^2\end{matrix},$$

and $R^1$, $R^2$, X and Y have the stated meanings.

The compounds of the formula I are useful for dyeing hydroxyl-containing substrates and wool. Depending on their constitution, they give bluish-violet to navy dyeings which in general exhibit good yield and are lightfast and particularly fast to wet treatments.

All conventional dyeing methods are suitable, the particular one used depending on the reactive radical.

The Examples illustrate a typical range of preparation methods for dyes of the formula I. Parts and percentages are by weight, unless stated otherwise.

EXAMPLE 1

60 parts of the red monoazo dye obtained by coupling the diazotization product of 2-trifluoromethyl-4-chloro-6-sulfoaniline with 1-amino-8-hydroxynaphthalene-3,6-disulfonic acid in a solution containing a mineral acid are combined, at 0°–5° C., with a suspension of the product obtained by diazotizing 33.9 parts of the primary condensate of 1,3-phenylenediamine-4-sulfonic acid and cyanuric chloride in a medium containing hydrochloric acid. Coupling is carried out under weakly acidic conditions by adding a total of 22.5 parts of sodium carbonate a little at a time, after which 45 parts of 25% strength ammonia are added and stirring is continued at 40°–45° C. until the reaction is complete. The dye is precipitated from neutral solution with potassium chloride and is dried to give a bluish black powder, which dyes cotton in fast, deep reddish navy hues. The dye is of the general formula

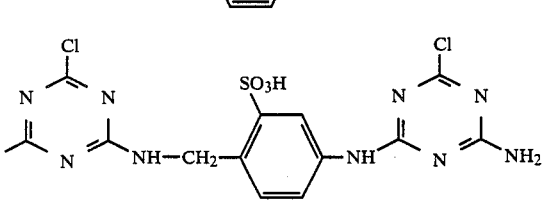

and

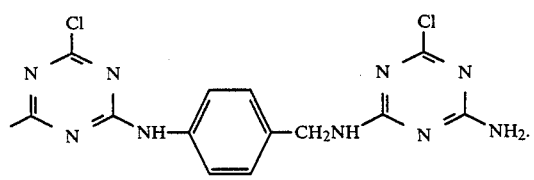

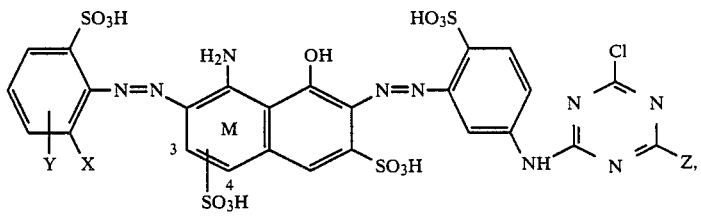

where Y is 4-chloro, X is trifluoromethyl and Z is amino, and the sulfo group in ring M is bonded in the 3-position.

Other novel dyes are listed in Table I:

TABLE I

| Example | Y | X | Position in ring M | Z | Hue |
|---------|---|---|---|---|---|
| 2 | 4-$CH_3SO_2$ | Cl | 3- | $-NH_2$ | reddish navy |
| 3 | 4-$CH_3SO_2$ | Cl | 3- | $-NH-C_6H_4-SO_3H$ | reddish navy |
| 4 | 4-$SO_3H$ | Cl | 3- | $-NH_2$ | reddish navy |
| 5 | 4-$SO_3H$ | Cl | 3- | $-N(CH_3)-C_6H_5$ | reddish navy |
| 6 | 4-$SO_3H$ | Cl | 3- | $-NH-C_6H_5$ | reddish navy |
| 7 | 4-$SO_3H$ | Cl | 3- | $-NH-C_6H_4-SO_3H$ | reddish navy |
| 8 | 4-$SO_3H$ | Cl | 4- | $-NH_2$ | bluish violet |
| 9 | 4-$SO_3H$ | Br | 3- | $-N(CH_3)-C_6H_4-CH_3$ | reddish navy |
| 10 | 4-$SO_3H$ | Br | 3- | $-NH_2$ | reddish navy |
| 11 | 4-$SO_3H$ | Br | 3- | $-NH-C_6H_4-SO_3H$ | reddish navy |
| 12 | 4-$SO_3H$ | F | 3- | $-NH_2$ | reddish navy |
| 13 | 4-$SO_3H$ | F | 3- | $-NH-C_6H_5$ | reddish navy |
| 14 | 4-$SO_3H$ | Cl | 3- | $-C_6H_5$ | reddish navy |
| 15 | 4-$SO_3H$ | Cl | 3- | $-Cl$ | reddish navy |
| 16 | 4-$SO_3H$ | Cl | 3- | $-OCH_3$ | reddish navy |
| 17 | 4-$SO_3H$ | Cl | 3- | $-NH-C_6H_4-SO_2-C_2H_4-O-SO_3H$ | reddish navy |
| 18 | 4-$SO_3H$ | Cl | 3- | $-NH-C_6H_4(SO_2-C_2H_4-O-SO_3H)$ | reddish navy |

TABLE I-continued

| Example | Y | X | Position in ring M | Z | Hue |
|---|---|---|---|---|---|
| 19 | 4-Cl | CF$_3$ | 3- | —NH—CH$_2$—C$_6$H$_4$—SO$_2$C$_2$H$_4$OSO$_3$H | deep reddish navy |
| 20 | 4-Cl | Cl | 3- | —NH$_2$ | reddish navy |
| 21 | 4-Cl | Cl | 3- | —NH—C$_6$H$_4$—SO$_3$H | reddish navy |
| 22 | 3-Cl | CH$_3$ | 3- | —NH$_2$ | reddish navy |
| 23 | 3-Cl | CH$_3$ | 3- | —NH—C$_6$H$_4$—SO$_3$H | reddish navy |
| 24 | 4-Cl | CH$_3$ | 3- | —NH$_2$ | reddish navy |
| 25 | 4-Cl | CH$_3$ | 3- | —NH—C$_6$H$_4$—SO$_3$H | reddish navy |
| 26 | 4-CH$_3$SO$_2$ | Cl | 3- | —NH—C$_6$H$_4$—SO$_2$C$_2$H$_4$—O—SO$_3$H | reddish navy |
| 27 | 4-CH$_3$SO$_2$ | Cl | 3- | —NHCH$_2$—C$_6$H$_4$—SO$_2$C$_2$H$_4$OSO$_3$H | reddish navy |

EXAMPLE 28

61 parts of the red monoazo dye obtained when the diazotization product of 2-chloro-4,6-disulfoaniline is coupled to 1-amino-8-hydroxynaphthalene-3,6-disulfonic acid in a solution containing a mineral acid are added, at 5° C., to 34 parts of the product obtained by diazotizing the primary condensate of 1,3-phenylenediamine-4-sulfonic acid and 5-chloro-2,4,6-trifluoropyrimidine in a solution containing hydrochloric acid. Coupling is completed in a neutral solution by the addition of 22 parts of sodium carbonate, and the dye is precipitated with potassium chloride and dried under mild conditions. The resulting bluish black powder dyes cotton in fast reddish navy hues.

EXAMPLE 29

A dye having similar properties and a redder hue is obtained if 1-amino-8-hydroxynaphthalene-4,6-disulfonic acid is used instead of the 1-amino-8-hydroxynaphthalene-3,6-disulfonic acid employed in Example 28.

We claim:
1. A compound of the formula:

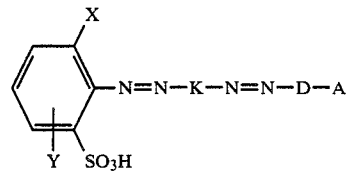

wherein:
A is chlorotriazine of the formula:

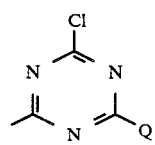

bonded to the chromophore via an imino or iminomethylene bridge;
Q is chlorine, phenyl, methoxy, ethoxy, propoxy, isopropoxy, or NR$^1$R$^2$; and
R$^1$ is hydrogen or C$_1$–C$_8$-alkyl, or R$^1$ is cycloalkyl, aryl, or substituted aryl, and R$^2$ is hydrogen or C$_1$–C$_8$-alkyl;

D is a 1,3-phenylenediamine-4-sulfonic acid, 1,4-phenylenediamine-2-sulfonic acid, 1,3-diamino-4-sulfo-6-methylbenzene, 1,3-diamino-4,6-disulfobenzene, 1,4-diamino-2,5-disulfobenzene, 1,6-diaminonaphthalene-4-sulfonic acid or 2,6-diaminonaphthalene-4,8-disulfonic acid;

K is 1-amino-8-hydroxynaphthalene-4,6-disulfonic acid or 1-amino-8-hydroxynaphthalene-3,6-disulfonic acid;

X is chlorine or bromine; and

Y is hydroxysulfonyl, hydroxycarbonyl or aminosulfonyl.

2. The compound of claim 1, wherein Q is chlorine, phenyl or methoxy.

3. The compound of claim 1, wherein Q is ethoxy, propoxy or isopropoxy.

4. The compound of claim 1, wherein $R^1$ is hydrogen or $C_1$–$C_8$-alkyl.

5. The compound of claim 1, wherein $R^1$ is cycloalkyl, aryl, or substituted aryl.

6. The compound of claim 1, wherein D is 1,3-phenylenediamine-4-sulfonic acid or 1,4-phenylenediamine-2-sulfonic acid.

7. The compound of claim 1, wherein D is 1,3-diamino-4-sulfo-6-methylbenzene or 1,3-diamino-4,6-disulfobenzene.

8. The compound of claim 1, wherein D is 1,4-diamino-2,5-disulfobenzene or 1,6-diaminonaphthalene-4-sulfonic acid or 2,6-diaminonaphthalene-4,8-disulfonic acid.

9. The compound of claim 1, wherein K is 1-amino-8-hydroxynaphthalene-4,6-disulfonic acid.

10. The compound of claim 1, wherein K is 1-amino-8-hydroxynaphthalene-3,6-disulfonic acid.

11. The compound of claim 1, wherein X is chlorine.

12. The compound of claim 1, wherein X is bromine.

13. The compound of claim 1, wherein Y is hydroxysulfonyl.

14. The compound of claim 1, wherein Y is hydroxycarbonyl.

15. The compound of claim 1, wherein Y is aminosulfonyl.

* * * * *

UNITED STATES PATENT AND TRADEMARK OFFICE
CERTIFICATE OF CORRECTION

PATENT NO. : 4,801,693
DATED : Jan. 31, 1989
INVENTOR(S) : Ortwin SCHAFFER, et al.

It is certified that error appears in the above-identified patent and that said Letters Patent is hereby corrected as shown below:

The following entry should appear on the Title page:

-- [30] Foreign Application Priority Data

Jun. 1, 1984 [DE] Federal Republic of Germany...3420467 --

Signed and Sealed this

Twenty-fifth Day of July, 1989

Attest:

DONALD J. QUIGG

Attesting Officer

Commissioner of Patents and Trademarks